(12) United States Patent
Glover

(10) Patent No.: US 6,322,307 B1
(45) Date of Patent: Nov. 27, 2001

(54) FIXING ANCHOR

(75) Inventor: Frank Glover, Nr.Leominster (GB)

(73) Assignee: Unifix Limited, West Midlands (GB)

( * ) Notice: Subject to any disclaimer, the term of this patent is extended or adjusted under 35 U.S.C. 154(b) by 0 days.

(21) Appl. No.: 09/463,462

(22) PCT Filed: Jul. 27, 1998

(86) PCT No.: PCT/GB98/02233

§ 371 Date: Apr. 3, 2000

§ 102(e) Date: Apr. 3, 2000

(87) PCT Pub. No.: WO99/05421

PCT Pub. Date: Feb. 4, 1999

(30) Foreign Application Priority Data

Jul. 26, 1997 (GB) .................................................. 9715779

(51) Int. Cl.[7] .................................................. F16B 35/04
(52) U.S. Cl. .................................................. 411/412; 411/423
(58) Field of Search .................................. 411/411, 412, 411/414, 423

(56) References Cited

U.S. PATENT DOCUMENTS

| | | | |
|---|---|---|---|
| Re. 34,969 | * | 6/1995 | Dixon . |
| 3,495,494 | * | 2/1970 | Scott . |
| 3,865,006 | * | 2/1975 | Massoney . |
| 3,942,405 | * | 3/1976 | Wagner . |
| 4,439,077 | * | 3/1984 | Godsted . |
| 4,572,720 | * | 2/1986 | Rockenfeller . |
| 4,673,323 | * | 6/1987 | Russo . |
| 5,190,426 | * | 3/1993 | Wieder . |
| 5,674,035 | * | 10/1997 | Hettich . |
| 5,800,107 | * | 9/1998 | Giannuzzi . |
| 5,957,646 | * | 9/1999 | Giannuzzi . |

FOREIGN PATENT DOCUMENTS

| | | | |
|---|---|---|---|
| 4227272 | * | 2/1994 | (DE) . |
| 1343865 | * | 11/1963 | (FR) . |
| 2688689 | * | 9/1993 | (FR) . |
| 1580356 | * | 12/1980 | (GB) . |

* cited by examiner

*Primary Examiner*—Flemming Saether
(74) *Attorney, Agent, or Firm*—Laff, Whitesel & Saret, Ltd.; J. Warren Whitesel

(57) ABSTRACT

A threaded fastener (1) is disclosed for anchoring into a substrate comprising a core portion (2) having at least one helical continuous thread provided along a substantial portion of the length of the core, in which the helical thread has a substantially V-shaped cross section defining two flanks (4a, 4b) which subtend an angle of between substantially 60° and 90°, and the thread has a helix angle of between approximately 20° and 45°. The crest of the thread may be flattened, and the fastener (1) is especially suited to anchoring to a masonry substrate.

17 Claims, 3 Drawing Sheets

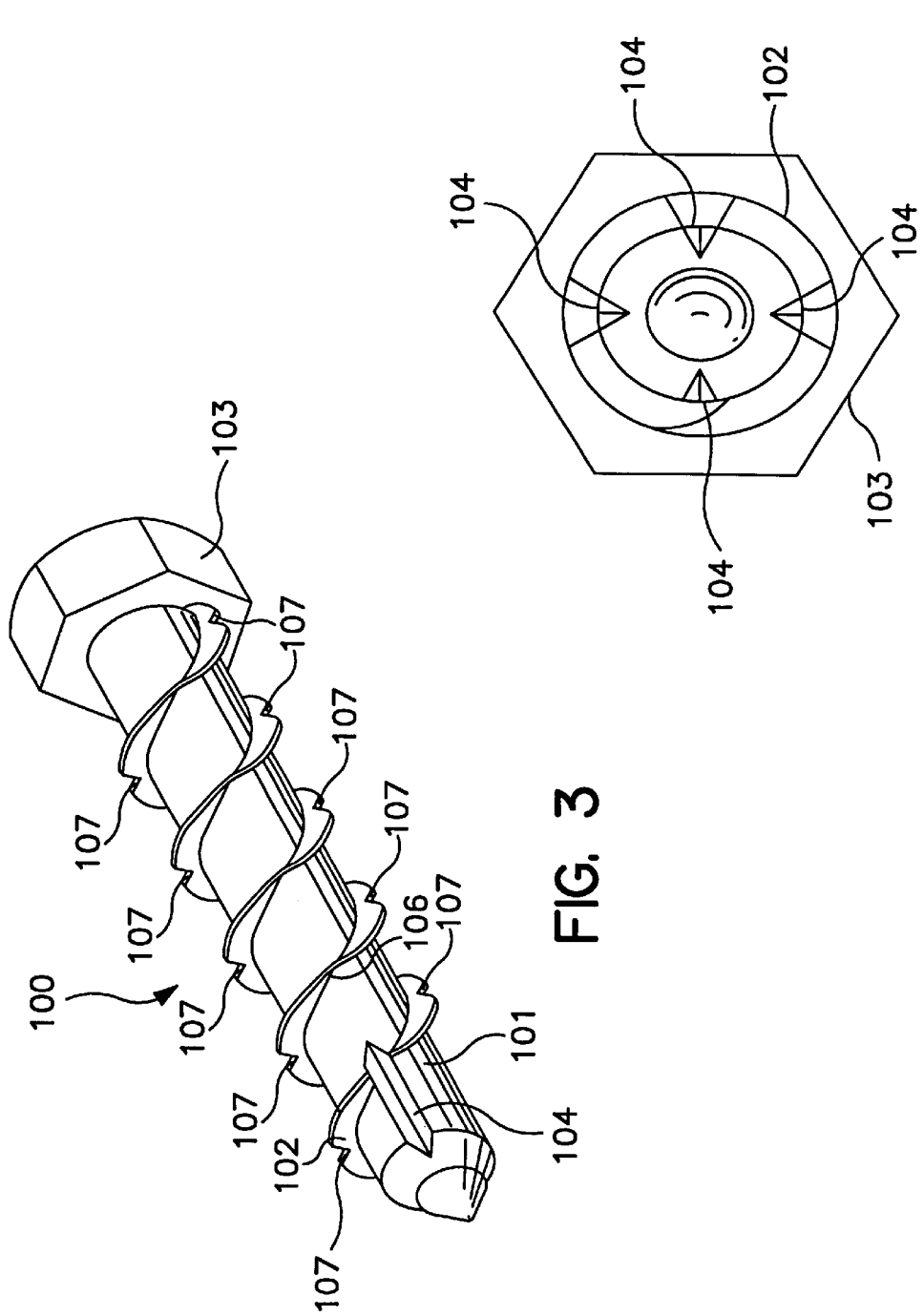

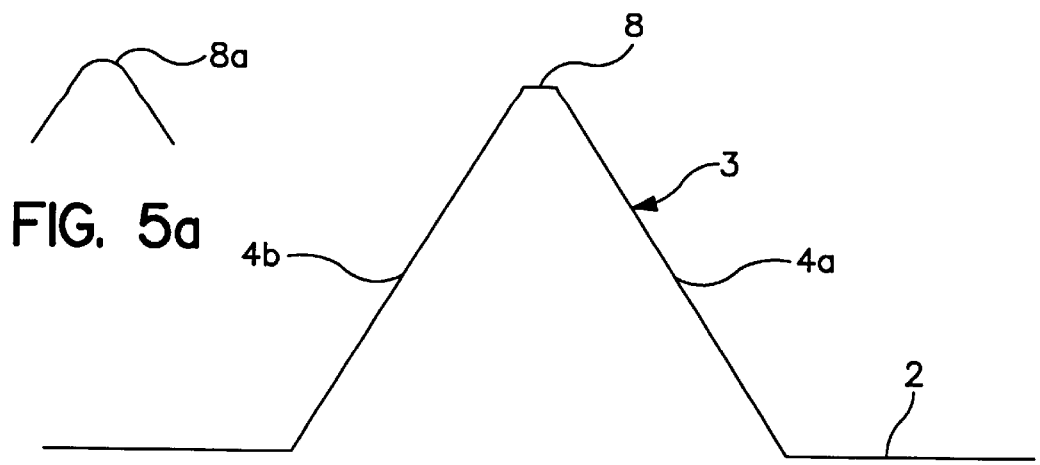
FIG. 5a
FIG. 5
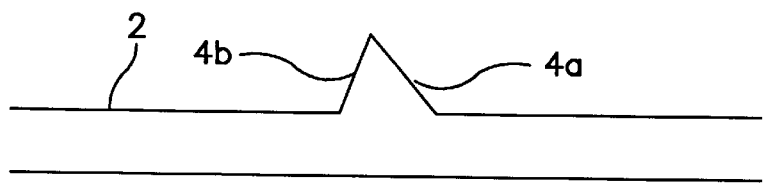
FIG. 6a
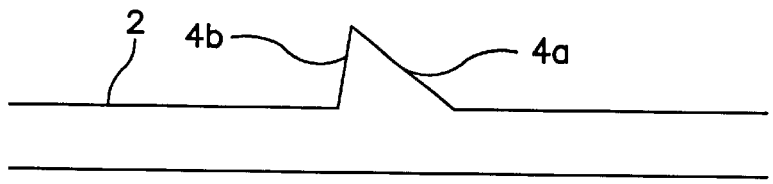
FIG. 6b
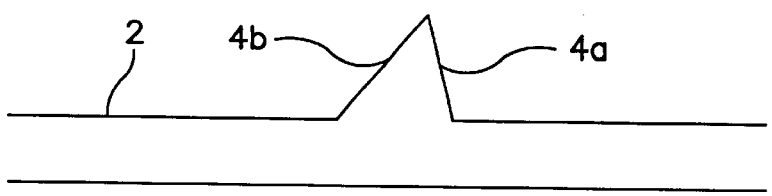
FIG. 6c

FIXING ANCHOR

This invention relates to improvements in fixing anchors, in particular threaded fasteners for fixing into brick, blocks, masonry or the like.

BACKGROUND OF THE INVENTION

It is well known that with the exception of resin anchors, fixing anchors for use by the construction industry or hobbyists are generally designed to work in specific substrates such as concrete or masonry. One well known method for fixing to relatively hard and/or brittle substrates such as concrete or brick or stone, is to first drill a hole in the substrate and then insert an anchor which includes an expansion mechanism. A standard screw may then be inserted within the anchor which causes the anchor to expand as it is tightened. The expansion of the anchor exerts a radially directed compressive force on the walls of the pre-drilled hole which holds the anchor in place.

SUMMARY OF THE INVENTION

An alternative method of fixing into concrete is to employ a self tapping screw. However, such a fixing is suitable where only light loads are to be carried by the fixing, and is not well suited to soft substrates.

According to a first aspect of the invention, a threaded fastener for anchoring into a substrate comprises a core portion having at least one helical continuous thread provided along a substantial portion of the length of the core, in which the helical thread has a substantially V-shaped cross section defining two flanks which subtend an angle of between 60° and 90°, and the thread has a helix angle of between approximately 20° and 45°, and characterised in that the two flanks meet at a crest which is rounded.

The helix angle between 20° and 45° allows the fastener to be inserted into the substrate with a small number of turns compared to a small helix angle of, say, 5° to 10°. The choice of 60° to 90° for the thread ensures that tensile forces applied along the axis of the fastener are directed into the substrate at an angle well away from the axis providing good tensile performance in soft substrates and indeed across a wide range of substrates.

The threaded fastener is suitable for use with any substrate, but is most preferably used for fastening in relatively soft substrates such as brick or blockwork, sand stone or lime stone.

Most preferably, the helix angle of the thread is 25°.

A flat/radius for the crest of 0.01–0.015 inches is preferred.

An advantage of the provision of only a single helical thread is that it provides a reduced insertion torque when compared to the provision of a dual thread. Also, a dual thread offers a reduced distance between the threads for any given helix angle which is disadvantageous.

Preferably, the ratio of the outside diameter of the thread to the pitch of the thread is substantially within the range 0.5 to 0.9. This ensures good levels of performance in soft substrates.

Preferably, the ratio of the outside diameter of the thread to the inside diameter of the thread (i.e. the outside diameter of the core) is substantially in the range 1.25 to 1.5. Thus, the diameter of the thread is quite large compared to the diameter of the core, which ensures that the fastener remains fast within the substrate under large tensile loads.

The threaded fastener may further include a secondary balancing thread which may be located in between the turns of the first helical thread. This thread can help guide the fastener when inserting into a pre-drilled hole, and may be chosen to have a diameter approximately equal to the hole diameter whilst the core is slightly smaller in diameter than the hole. The crest of the secondary thread may be flattened or rounded.

Preferably, the core portion is substantially smooth and cylindrical over a substantial portion of its length other than the provision of the first (and optional second) helical threads. Thus, no grooves are provided at the join between the sides of the thread and the shank which could clog with loose debris during installation.

The two flanks of the first and/or second threads may subtend equal angles with the core. Alternatively, the angle between one thread flank and the core and the other thread flank and the core may be different provided the angle subtended by the two flanks is in the range 60° to 90°.

A bolt head or other head form (such as a stud, hook or eye) may be provided on one end of the core which has a hexagonal outline for engagement with a suitably shaped insertion tool.

The other end of the core may finish at a point or taper, and may be provided with one or more axially extending grooves spaced around the circumference of the core. The first and/or second threads may extend to a point or taper at the tip of the core to facilitate self-tapping of the fastener into the substrates. These notches help to facilitate ease of thread cutting in harder substrates.

A method of inserting the fastener according to the first aspect into a substrate may comprise pre-drilling a hole having a diameter greater than the core of the fastener but smaller than the outside diameter of the main thread and inserting the fastener into the hole. When a secondary thread is also provided, the diameter of the pre-drilled hole may be slightly smaller than or substantially equal to the outside diameter of the secondary thread. This allows the second threads to act as a guide in the hole or possibly bite into the substrate.

The fastener may be fabricated from a material, i.e. steel which is then hardened. This is particularly suitable for use of the fastener in relatively hard and/or abrasive substrates such as concrete. Alternatively, the fastener may be made from a plastics material, e.g. for use with aercrete substrates.

The fastener may be made by rolling to produce the thread or by turning or casting. The fastener may be hardened after it is produced.

BRIEF DESCRIPTION OF THE INVENTION

There will now be described by way of example only two embodiments of the invention with reference to the accompanying drawings in which:

FIG. 3 is an illustration of a second embodiment of a threaded fastener;

FIG. 4 is an end view of the fastener of FIG. 3;

FIG. 5 shows a flat portion provided at the crest of the thread; and

FIG. 5a shows a rounded portion at the crest of the thread; and

FIGS. 6a,b,c show various possible thread cross sections.

DETAILED DESCRIPTION OF THE INVENTION

Figure 1:
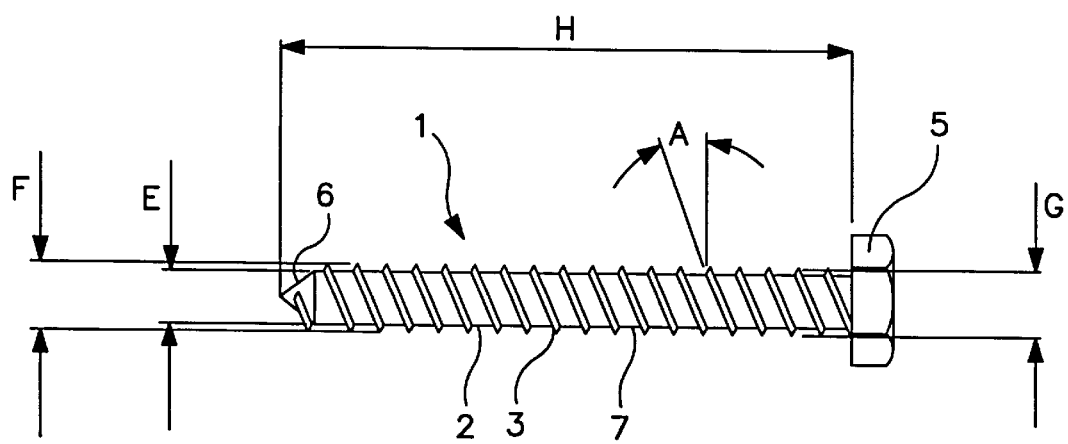
FIG. 1 is an illustration of a first embodiment of a threaded fastener.
Figure 2:
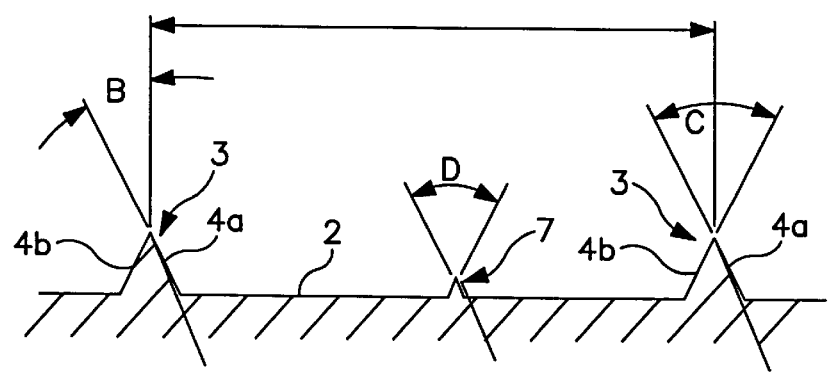
FIG. 2 is a cross sectional view of the thread profile of the threaded fastener of FIG. 1.

A first embodiment of a threaded fastener is shown in FIGS. 1 and 2 of the accompanying drawings.

The fastener 1 comprises a solid elongate cylindrical core 2 having a central axis of rotation. A main thread 3 having a helical form is provided along a length of the core 2 from a point proximal a first end of the core 2 to a point proximal a second end of the core 2. A hexagonal head 5 is provided on the second end of the core to allow the fastener to be rotated using a spanner or grips, whilst the other end of the core 2 tapers to a point 6.

The core and thread are formed in one piece using a rolling die, and it is preferably made from steel. The steel is then hardened to produce a hard surface layer of approximately 0.008"–0.012".

The main thread 3 provided on the core has a helix angle A of between substantially 20 and 45 degrees, and preferably 25 degrees. The dimensions of the fastener are such that the ratio of the outside diameter F of the thread to the outside diameter E of the core is between 1.25 and 1.5.

The ratio of the outside diameter of the thread F to the pitch of the thread is between 0.5 and 0.9 approximately, and the two sides 4a, 4b of the thread subtend an inclusive angle of between substantially 60° and 90° and preferably 60° approximately. This ensures that when a tensile load is applied to the fastener it causes it to lock into place in the substrate rather than fracturing the surrounding substrate. A flat portion 8 or rounded portion 8a may be provided at the crest of the thread as shown in FIGS. 5 and 5a. The flat portion 8 is preferably for use with harder substrates such as concrete with flint aggregates. In hard substrates, a sharp crest may become burred or damaged which could remove the hard outer surface causing the required insertion force to rise or failure to cut a clean thread.

In addition to the first thread 3 a second thread 7 is provided which is disposed in between the first thread 3 and is also of a helical, spaced form. The second thread 7 has an outside diameter G smaller than the outside diameter F of the first thread 3 and acts as a guide to ensure the bolt is accurately glided during insertion into a hole in the substrate. The ratio of the outside diameter of the first thread 3 to the second thread 7 is between 1.05 and 1.2 with the two sides of the second thread subtending an angle of substantially 60°.

It is envisaged that several size fasteners can be manufactured and the fastener shown in the accompanying figures has a length H of approximately 100 mm, with the core diameter being between 7.5 mm and 7.6 mm. This allows the fastener to be inserted into a 8 mm predrilled hole made using a masonry/hammer drill. Of course, larger and smaller fasteners are possible within the scope of the invention, up to 20 mm core diameter or larger being possible. Tensile loads of up to and in excess of 2 tonnes may be carried by the fixing, depending on dimensions chosen.

An alternative embodiment 100 is shown in FIGS. 3 and 4 of the accompanying drawings.

The fastener comprises a core 101, a main thread 102, a second thread 106 and a head 103 which correspond to the core 2, main thread 3 and second thread 7 and head 5 of the first embodiment. In this embodiment, a number of grooves 104 which run from a point adjacent the first end of the core 101 in an axial direction along the length of the core 101 are provided. The grooves 104 may have a U-shaped or V-shaped cross-section or other cross-section and help the fastener 100 to cut a thread as opposed to forming a thread. In addition, or alternatively, the grooves may run along the length of the fastener to define a plurality of notches 107 in the thread 102. These notches 107 help to allow dust and other debris to escape as the thread cuts into the substrate. The notches may only be in the thread and not penetrate the core of the fastener.

This helps to substantially eliminate any radial or axial stresses which may otherwise be imposed into the surrounding substrate.

FIG. 6 is an illustration of the possible variations in thread cross-section which are envisaged within the scope of the invention. In FIG. 6(a), the two flanks 4a, 4b of the thread 3 subtend identical angles with the core 2. In FIGS. 6(b) and 6(c), the flanks subtend unequal angles so that the thread cross section is no longer symmetrical

What is claimed is:

1. A threaded fastener for anchoring into a brick, block, masonry substrate comprising a core portion having at least one helical continuous masonry thread provided along a substantial portion of the length of the core, said helical thread having a substantially V-shaped cross section defining two flanks which subtend an angle of between substantially 60° and 90°, and in which said thread has a helix angle of between approximately 200 and 450, and further in which said two flanks meet at a crest which is rounded.

2. A threaded fastener according to claim 1 wherein said thread has a helix angle of 25°.

3. A threaded fastener according to claim 1 wherein said two flanks of said thread meet at an edge defining said crest.

4. A threaded fastener according to claim 1 wherein said crest has a radius of 0.01 inches to 0.015 inches.

5. A threaded fastener according to claim 1 wherein the ratio of an outside diameter of said thread to a pitch of said thread is substantially within the range 0.5 to 0.9.

6. A threaded fastener according to claim 1 wherein the ratio of the outside diameter of said thread to the inside diameter of said thread is substantially in the range 1.25 to 1.5.

7. A threaded fastener according to claim 1 wherein said crest of said secondary thread is flattened or rounded.

8. A threaded fastener according to claim 1 said core portion is substantially smooth and cylindrical over a substantial portion of its length other than the provision of said first helical thread.

9. A threaded fastener according to claim 1 wherein said two flanks of said first thread subtend equal angles with said core.

10. A threaded fastener according to claim 1 wherein said two flanks of said secondary thread subtend equal angles with said core.

11. A threaded fastener according to claim 1 wherein the angle between one thread flank and said core is different to that of the second thread flank to said core.

12. A threaded fastener according to claim 1 wherein a head form is provided on one end of said core which has a hexagonal outline for engagement with a suitably shaped insertion tool.

13. A threaded fastener according to claim 12 wherein the other end of said core finishes at a point or taper.

14. A threaded fastener according to claim 13 said other end of said fastener is provided with one or more axially extending grooves spaced around the circumference of the core.

15. A threaded fastener according to claim 1 wherein said fastener is fabricated from a material which is then hardened.

16. A threaded fastener according to claim 1 which is made from a plastics material.

17. A method of inserting a fastener into brick, blocks, or masonry comprising the steps of providing a masonry fastener having core portion having a first helical continuous thread provided along a substantial portion of the length of the core for a number of turns, said helical thread having a substantially V-shaped cross section defining two flanks which subtend an angle of between substantially 60° and 90°, and in which said thread has a helix angle of between approximately 20° and 40°, said two flanks meeting at a crest which is rounded, and further having a secondary balancing thread located in between the turns of said first helical thread, pre-drilling a hole having a diameter greater than said core of said fastener but smaller than an outside diameter of said main thread and inserting said fastener into said hole, said pre-drilled hole having a diameter substantially equal to an outside diameter of said secondary thread.

* * * * *